United States Patent
Luft

[15] 3,698,759
[45] Oct. 17, 1972

[54] SUPPORTING, LEVELING AND HEIGHT ADJUSTMENT MEANS

[72] Inventor: Robert G. Luft, Wildwood, Ill.

[73] Assignee: International Harvester Company, Chicago, Ill.

[22] Filed: July 7, 1970

[21] Appl. No.: 52,939

[52] U.S. Cl. ........................296/35 R, 180/89
[51] Int. Cl. ..............................B62d 27/00
[58] Field of Search ...296/35 R, 35 A, 28 C; 180/89; 52/122, 126; 248/295

[56] References Cited

UNITED STATES PATENTS

| | | | |
|---|---|---|---|
| 479,254 | 7/1892 | Duke | 248/295 X |
| 2,925,135 | 2/1960 | Hamilton | 296/28 C |
| 950,517 | 3/1910 | Seidel | 248/295 X |
| 2,425,948 | 8/1947 | Lucien | 296/28 |
| 3,352,598 | 11/1967 | Anderson | 296/35 R |

FOREIGN PATENTS OR APPLICATIONS

| | | | |
|---|---|---|---|
| 701,413 | 12/1953 | Great Britain | 296/28 K |

*Primary Examiner*—Benjamin Hersh
*Assistant Examiner*—John A. Pekar
*Attorney*—Floyd B. Harman

[57] ABSTRACT

A means for supporting, leveling and adjusting the height of a sub-frame relative to a main frame including a pair of laterally spaced, vertically adjustable elements carried by the main frame and a surface formed on the sub-frame capable of engaging said elements. Selective adjustment of the vertically adjustable elements permits proper alignment of the sub-frame relative to the main frame and fastening means lock the two frames relative to each other.

3 Claims, 4 Drawing Figures

PATENTED OCT 17 1972 3,698,759
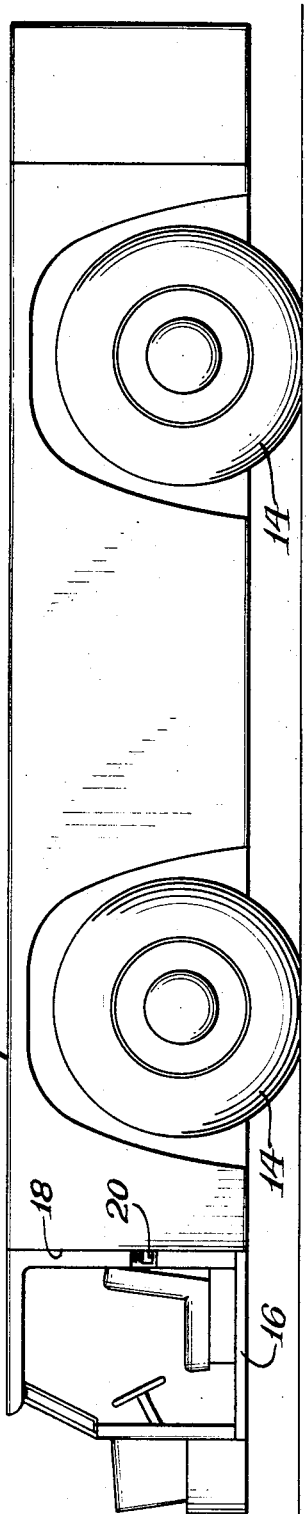
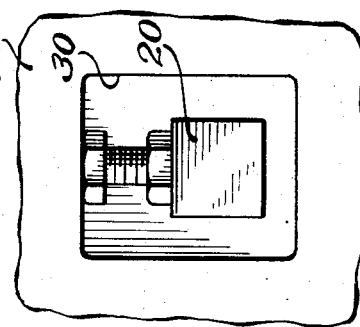
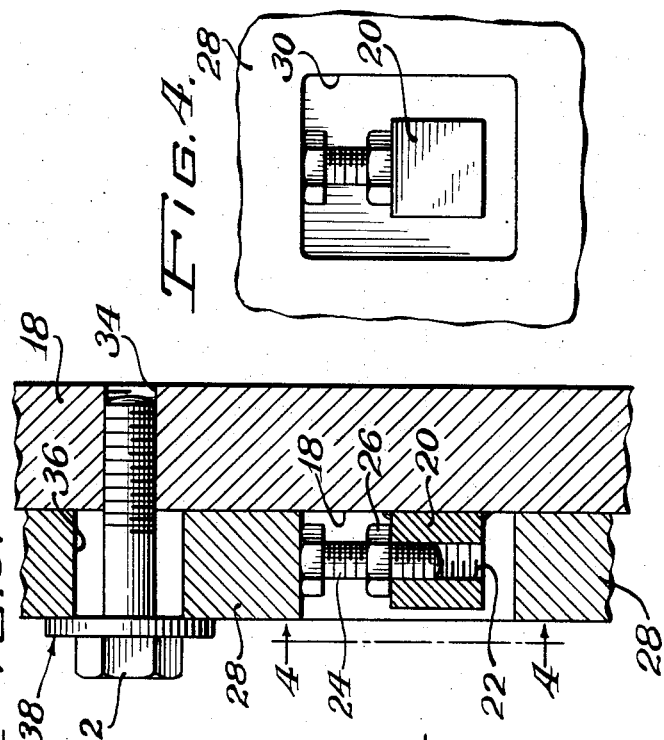
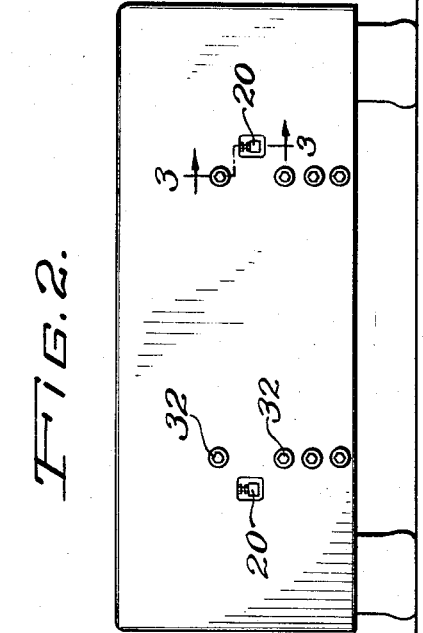
Inventor:
Robert G. Luft
By
Atty.

SUPPORTING, LEVELING AND HEIGHT ADJUSTMENT MEANS

BACKGROUND AND SUMMARY OF THE INVENTION

In some large vehicles it is desirable or necessary to construct the frame in sub-assembly form. This approach is especially beneficial when a family of closely related vehicles is to be produced which utilize a common central frame portion. This central frame portion or main frame can be produced for all vehicles in the family and the sub-frames which attach to each end of the main frame can be varied to meet the specification of the purchaser. While this approach gives considerable flexibility in design and economies in manufacture, it is not without some problems. When the main frame and sub-frames are manufactured separately, the tolerances and variations that necessarily result cause alignment problems. That is, the top of the main frame and the top of the sub-frame may not be perfectly aligned with each other when the two are assembled. While in some applications this can be tolerated, it is imperative to avoid such misalignment in others. For example, tow tractors for large aircraft are designed so that the upper surface of the vehicle is flat and smooth in order that it may function as a work platform for the attendant in making the various connections with the aircraft for the required ground support. If the main frame and sub-frame are not perfectly aligned when assembled, the upper surface will not be flat and smooth and could present a safety hazard to the attendant as he walks about on the upper surface of the vehicle.

Since even the sub-frame of the large aircraft tow tractors is quite heavy and cumbersome, the adjustment means must be relatively simple from an operational standpoint and must be capable of being adjusted after the sub-frame has been at least partially secured to the main frame.

It is, therefore, an object of the present invention to provide a means for supporting, leveling and adjusting the height of a sub-frame relative to a main frame.

It is also an object of this invention to provide such an adjustment means which is relatively inexpensive, which permits the sub-frame to be at least partially secured to the main frame prior to the adjustment, and which adjustment means permits alignment of the two frames relatively quickly and easily.

These, and other objects of the present invention and many of its attendant advantages will become apparent upon a perusal of the following description and the accompanying drawings, wherein:

FIG. 1 is a side elevational view of a vehicle incorporating the present invention;

FIG. 2 is a front elevational view of the vehicle of FIG. 1;

FIG. 3 is a cross-sectional view taken on line 3—3 of FIG. 2; and

FIG. 4 is a cross-sectional view taken on line 4—4 of FIG. 3.

DESCRIPTION OF THE PREFERRED EMBODIMENT

A vehicle 10, which may be of the type disclosed in patent application Ser. No. 796,371 filed Feb. 4, 1969, now U.S. Pat. No. 3,614,989 is provided with a central frame portion or main frame 12 which is supported on ground-engaging wheels 14. A sub-frame assembly 16 which may comprise, for example, an operator's station of a particular type or an auxiliary power unit, is secured to the main frame 12 in cantilever fashion. An outer transverse vertical wall 18 of the central frame 12 is provided with a pair of laterally spaced bosses 20 which are secured to the wall 18 in any suitable manner such as by welding, for example. The bosses 20 are provided with tapped holes 22. A bolt 24 threadedly engages the tapped hole 22 and a locknut 26 is provided on the bolt between the bolt head and the top of the boss 20. The sub-frame 16 is provided with a wall portion 28 which is complementary to the wall 18 of the central frame 12. A pair of generally rectangular openings 30 are provided in the wall 28 and are located to permit the adjustment means comprising the boss 20 and the bolt 24 to nest within the rectangular openings 30. It can be seen that with the upper surfaces of the openings 30 resting upon the heads of the bolts 24, selective turning of the bolt 24 into and out of the threaded opening 22 in the bosses 20 will permit leveling and height adjustment of the sub-frame 16 relative to the main frame 12.

Fastening means are provided for securing the sub-frame 16 to the main frame 12 and comprise a plurality of bolts 32 which are threadedly engageable with tapped holes 34 provided in the wall 18 of the main frame 12. The bolts 32 extend through enlarged holes 36 in the wall 28 of the sub-frame 16. Washers 38 are provided between the head of the bolts 32 and the wall 28. The enlarged openings 36 permit a limited amount of movement of the sub-frame 16 relative to the main frame 12 to accommodate the adjustment affected by the adjusting means.

The assembly procedure for securing the sub-frame 16 to the main frame 12 can be achieved relatively quickly and easily in the following manner. The bolts 24 are first inserted in the tapped holes 22 and threaded to about their mid-points. The sub-frame 16 is then lifted by a crane or other power lift means and is manipulated so that the upper surfaces of the openings 30 are resting on the edge of the bolts 24. While the crane supports the weight of the sub-frame 16 the bolts 32, with the washers 38 positioned thereon, are inserted through the openings 36 and threaded into engagement with the tapped holes 34. The bolts 32 are tightened an amount sufficient to retain the sub-frame 16 on the main frame 12 while permitting relative movement between the two. The crane can then be disconnected from the sub-frame and the bolts 24 individually threaded inward or outward of the threaded holes 22 in order to achieve perfect alignment between the main frame 12 and the sub-frame 16. Once such an alignment has been achieved, the locknuts 26 can be tightened to retain the two in such alignment and then the bolts 32 can be torqued down to the desired tightness.

While one embodiment of the present invention has been disclosed herein, it is to be understood that various changes and modifications may be made without departing from the spirit of the invention as defined by the scope of the appended claims.

What is claimed is:

1. A means for aligning and securing a sub-frame relative to a main frame of a vehicle, comprising:

a wall member on one of said frames having a pair of laterally spaced openings defining substantially horizontal surfaces;

a pair of laterally spaced, vertically adjustable means secured to the other of said frames, said means being engageable with said surfaces;

fastening means for securing said sub-frame to said main frame;

and each of said adjustable means including;

a boss secured to said other frame and having a threaded opening therein;

and a bolt threadedly engageable in said opening.

2. The invention according to claim 1 and further comprising:

a locknut engageable with the bolt and capable of locking the bolt relative to the boss.

3. A means for supporting, leveling and adjusting the height of a sub-frame relative to the main frame of a vehicle, comprising:

a wall member on said sub-frame having a plurality of enlarged holes and a pair of laterally spaced openings defining substantially horizontal surfaces;

a pair of bosses having tapped holes secured to the main frame and positioned complementary with the openings on the sub-frame;

bolts threadedly engaging the tapped holes and being vertically adjustable thereby; and fastening means extending through said enlarged holes for securing the sub-frame to the main frame.

* * * * *